United States Patent
Lydon et al.

(10) Patent No.: US 8,346,987 B2
(45) Date of Patent: Jan. 1, 2013

(54) COMMUNICATION PROTOCOL FOR USE WITH PORTABLE ELECTRONIC DEVICES

(75) Inventors: Gregory Thomas Lydon, Santa Cruz, CA (US); Scott Krueger, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/273,107

(22) Filed: Oct. 13, 2011

(65) Prior Publication Data

US 2012/0117274 A1 May 10, 2012

Related U.S. Application Data

(62) Division of application No. 11/439,521, filed on May 22, 2006, now Pat. No. 8,073,984.

(60) Provisional application No. 60/802,889, filed on May 22, 2006.

(51) Int. Cl.
G06F 3/00 (2006.01)

(52) U.S. Cl. .............................. 710/10; 710/9

(58) Field of Classification Search ............... 710/8, 10, 710/11, 14, 110, 305; 709/224, 225; 707/621
See application file for complete search history.

(56) References Cited

U.S. PATENT DOCUMENTS

| | | | |
|---|---|---|---|
| 3,807,388 A | 4/1974 | Orr et al. | |
| 4,089,057 A | 5/1978 | Eriksson | |
| 4,101,873 A | 7/1978 | Anderson et al. | |
| 4,195,642 A | 4/1980 | Price et al. | |
| 4,371,188 A | 2/1983 | Hull | |
| 4,371,945 A | 2/1983 | Karr et al. | |
| 4,375,674 A | 3/1983 | Thornton | |
| 4,434,801 A | 3/1984 | Jiminez et al. | |
| 4,516,110 A | 5/1985 | Overmyer | |
| 4,578,769 A | 3/1986 | Frederick | |
| 4,625,733 A | 12/1986 | Saynajakangas | |
| 4,649,552 A | 3/1987 | Yukawa | |
| 4,694,694 A | 9/1987 | Vlakancic et al. | |
| 4,703,445 A | 10/1987 | Dassler | |
| 4,722,222 A | 2/1988 | Purdy et al. | |
| 4,736,312 A | 4/1988 | Dassler et al. | |
| 4,757,453 A | 7/1988 | Nasiff | |
| 4,757,714 A | 7/1988 | Purdy et al. | |
| 4,759,219 A | 7/1988 | Cobb et al. | |

(Continued)

FOREIGN PATENT DOCUMENTS

EP 0336782 A2 10/1989

(Continued)

OTHER PUBLICATIONS

Office Action dated Aug. 21, 2012 in Japanese Application No. 2011-159446, 3 pages.

(Continued)

*Primary Examiner* — Khanh Dang
(74) *Attorney, Agent, or Firm* — Kilpatrick Townsend & Stockton

(57) ABSTRACT

Improved techniques for communicating between a portable electronic device and an accessory (or auxiliary) device are disclosed. The accessory device can augment or supplement the functionality or capabilities of the portable electronic device. For example, in one embodiment, the accessory device can provide wireless communication capabilities to the portable electronic device. In one embodiment, the portable electronic device pertains to a portable media player and thus provide media data for storage, playback or transmission. In one embodiment, the accessory device is attachable to the portable electronic device.

10 Claims, 10 Drawing Sheets

U.S. PATENT DOCUMENTS

| | | |
|---|---|---|
| 4,763,275 A | 8/1988 | Carlin |
| 4,763,284 A | 8/1988 | Carlin |
| 4,763,287 A | 8/1988 | Gerhaeuser et al. |
| 4,771,394 A | 9/1988 | Cavanagh |
| 4,774,679 A | 9/1988 | Carlin |
| 4,822,042 A | 4/1989 | Landsman |
| 4,824,107 A | 4/1989 | French |
| 4,830,021 A | 5/1989 | Thornton |
| 4,862,394 A | 8/1989 | Thompson et al. |
| 4,862,395 A | 8/1989 | Fey et al. |
| 4,873,867 A | 10/1989 | McPherson et al. |
| 4,883,271 A | 11/1989 | French |
| 4,903,212 A | 2/1990 | Yokouchi et al. |
| 4,935,887 A | 6/1990 | Abdalah et al. |
| 4,955,980 A | 9/1990 | Masuo |
| 5,033,013 A | 7/1991 | Kato et al. |
| 5,036,467 A | 7/1991 | Blackburn et al. |
| 5,056,783 A | 10/1991 | Matcovich et al. |
| 5,148,002 A | 9/1992 | Kuo et al. |
| 5,150,310 A | 9/1992 | Greenspun et al. |
| 5,181,181 A | 1/1993 | Glynn |
| 5,243,993 A | 9/1993 | Alexander et al. |
| 5,258,927 A | 11/1993 | Havriluk et al. |
| 5,295,085 A | 3/1994 | Hoffacker |
| 5,317,693 A | 5/1994 | Cuenod et al. |
| 5,324,038 A | 6/1994 | Sasser |
| 5,335,664 A | 8/1994 | Nagashima |
| 5,341,350 A | 8/1994 | Frank et al. |
| 5,343,445 A | 8/1994 | Cherdak |
| 5,392,458 A | 2/1995 | Sasuta et al. |
| 5,396,429 A | 3/1995 | Hanchett |
| 5,420,828 A | 5/1995 | Geiger |
| 5,436,838 A | 7/1995 | Miyamori |
| 5,446,775 A | 8/1995 | Wright et al. |
| 5,450,329 A | 9/1995 | Tanner |
| 5,452,269 A | 9/1995 | Cherdak |
| 5,471,405 A | 11/1995 | Marsh |
| 5,475,725 A | 12/1995 | Nakamura |
| 5,485,402 A | 1/1996 | Smith et al. |
| 5,509,082 A | 4/1996 | Toyama et al. |
| 5,513,854 A | 5/1996 | Daver |
| 5,524,637 A | 6/1996 | Erickson |
| 5,528,228 A | 6/1996 | Wilk |
| 5,541,604 A | 7/1996 | Meier |
| 5,546,307 A | 8/1996 | Mazur et al. |
| 5,546,974 A | 8/1996 | Bireley |
| 5,557,541 A | 9/1996 | Schulhof et al. |
| 5,564,698 A | 10/1996 | Honey et al. |
| 5,574,669 A | 11/1996 | Marshall |
| 5,583,776 A | 12/1996 | Levi et al. |
| 5,583,993 A | 12/1996 | Foster et al. |
| 5,590,908 A | 1/1997 | Carr |
| 5,592,401 A | 1/1997 | Kramer |
| 5,605,336 A | 2/1997 | Gaoiran et al. |
| 5,615,132 A | 3/1997 | Horton et al. |
| 5,617,084 A | 4/1997 | Sears |
| 5,617,386 A | 4/1997 | Choi |
| 5,636,146 A | 6/1997 | Flentov et al. |
| 5,671,010 A | 9/1997 | Shimbo et al. |
| 5,673,691 A | 10/1997 | Abrams et al. |
| 5,688,183 A | 11/1997 | Sabatino et al. |
| 5,690,119 A | 11/1997 | Rytky et al. |
| 5,694,340 A | 12/1997 | Kim |
| 5,710,922 A | 1/1998 | Alley et al. |
| 5,720,200 A | 2/1998 | Anderson et al. |
| 5,721,539 A | 2/1998 | Goetzl |
| 5,721,949 A | 2/1998 | Smith et al. |
| 5,723,786 A | 3/1998 | Klapman |
| 5,724,265 A | 3/1998 | Hutchings |
| 5,734,337 A | 3/1998 | Kupersmit |
| 5,738,104 A | 4/1998 | Lo et al. |
| 5,743,269 A | 4/1998 | Okigami et al. |
| 5,745,037 A | 4/1998 | Guthrie et al. |
| 5,794,164 A | 8/1998 | Beckert et al. |
| 5,797,089 A | 8/1998 | Nguyen |
| 5,812,056 A | 9/1998 | Law |
| 5,835,721 A | 11/1998 | Donahue et al. |
| 5,835,732 A | 11/1998 | Kikinis et al. |
| 5,862,803 A | 1/1999 | Besson et al. |
| 5,864,868 A | 1/1999 | Contois |
| 5,870,710 A | 2/1999 | Ozawa et al. |
| 5,881,240 A | 3/1999 | Asano |
| 5,891,042 A | 4/1999 | Sham et al. |
| 5,897,457 A | 4/1999 | Mackovjak |
| 5,899,963 A | 5/1999 | Hutchings |
| 5,914,941 A | 6/1999 | Janky |
| 5,918,281 A | 6/1999 | Nabulsi |
| 5,918,303 A | 6/1999 | Yamaura et al. |
| 5,920,728 A | 7/1999 | Hallowell et al. |
| 5,923,757 A | 7/1999 | Hocker et al. |
| 5,930,741 A | 7/1999 | Kramer |
| 5,955,667 A | 9/1999 | Fyfe |
| 5,956,651 A | 9/1999 | Willkie et al. |
| 5,959,568 A | 9/1999 | Woolley |
| 5,963,891 A | 10/1999 | Walker et al. |
| 5,974,333 A | 10/1999 | Chen |
| 5,976,083 A | 11/1999 | Richardson et al. |
| 5,978,972 A | 11/1999 | Stewart et al. |
| 5,983,073 A | 11/1999 | Ditzik |
| 6,002,982 A | 12/1999 | Fry |
| 6,006,274 A | 12/1999 | Hawkins et al. |
| 6,007,228 A | 12/1999 | Agarwal et al. |
| 6,011,491 A | 1/2000 | Goetzl |
| 6,013,007 A | 1/2000 | Root et al. |
| 6,018,677 A | 1/2000 | Vidrine et al. |
| 6,018,705 A | 1/2000 | Gaudet et al. |
| 6,020,851 A | 2/2000 | Busack |
| 6,028,625 A | 2/2000 | Cannon |
| 6,032,084 A | 2/2000 | Anderson et al. |
| 6,032,530 A | 3/2000 | Hock |
| 6,038,199 A | 3/2000 | Pawlowski et al. |
| 6,043,747 A | 3/2000 | Altenhofen |
| 6,052,654 A | 4/2000 | Gaudet et al. |
| 6,057,756 A | 5/2000 | Engellenner |
| 6,059,576 A | 5/2000 | Brann |
| 6,073,086 A | 6/2000 | Marinelli |
| 6,075,443 A | 6/2000 | Schepps et al. |
| 6,091,342 A | 7/2000 | Janesch et al. |
| 6,111,541 A | 8/2000 | Karmel |
| 6,122,340 A | 9/2000 | Darley et al. |
| 6,122,960 A | 9/2000 | Hutchings et al. |
| 6,125,686 A | 10/2000 | Haan et al. |
| 6,127,931 A | 10/2000 | Mohr |
| 6,148,271 A | 11/2000 | Marinelli |
| 6,151,647 A | 11/2000 | Sarat |
| 6,157,898 A | 12/2000 | Marinelli |
| 6,177,950 B1 | 1/2001 | Robb |
| 6,183,425 B1 | 2/2001 | Whalen et al. |
| 6,192,340 B1 | 2/2001 | Abecassis |
| 6,204,813 B1 | 3/2001 | Wadell et al. |
| 6,226,622 B1 | 5/2001 | Dabbiere |
| 6,230,322 B1 | 5/2001 | Saib et al. |
| 6,238,338 B1 | 5/2001 | DeLuca et al. |
| 6,247,135 B1 | 6/2001 | Feague |
| 6,248,946 B1 | 6/2001 | Dwek |
| 6,255,961 B1 | 7/2001 | Van Ryzin et al. |
| 6,259,892 B1 | 7/2001 | Helferich |
| 6,295,541 B1 | 9/2001 | Bodnar et al. |
| 6,298,314 B1 | 10/2001 | Blackadar et al. |
| 6,305,221 B1 | 10/2001 | Hutchings |
| 6,314,094 B1 | 11/2001 | Boys |
| 6,314,326 B1 | 11/2001 | Fuchu |
| 6,338,044 B1 | 1/2002 | Cook et al. |
| 6,339,706 B1 | 1/2002 | Tillgren et al. |
| 6,341,316 B1 | 1/2002 | Kloba et al. |
| 6,356,856 B1 | 3/2002 | Damen et al. |
| 6,360,597 B1 | 3/2002 | Hubbard, Jr. |
| 6,396,164 B1 | 5/2002 | Barnea et al. |
| 6,401,085 B1 | 6/2002 | Gershman et al. |
| 6,407,750 B1 | 6/2002 | Gioscia et al. |
| 6,408,332 B1 | 6/2002 | Matsumoto et al. |
| 6,436,052 B1 | 8/2002 | Nikolic et al. |
| 6,441,747 B1 | 8/2002 | Khair et al. |
| 6,463,385 B1 | 10/2002 | Fry |
| 6,473,630 B1 | 10/2002 | Baranowski et al. |
| 6,487,663 B1 | 11/2002 | Jaisimha et al. |
| 6,493,652 B1 | 12/2002 | Ohlenbusch et al. |

| | | |
|---|---|---|
| 6,501,393 B1 | 12/2002 | Richards et al. |
| 6,504,483 B1 | 1/2003 | Richards et al. |
| 6,510,210 B1 | 1/2003 | Baughan |
| 6,527,711 B1 | 3/2003 | Stivoric et al. |
| 6,529,131 B2 | 3/2003 | Wentworth |
| 6,531,982 B1 | 3/2003 | White et al. |
| 6,539,336 B1 | 3/2003 | Vock et al. |
| 6,559,773 B1 | 5/2003 | Berry |
| 6,563,417 B1 | 5/2003 | Shaw |
| 6,570,526 B1 | 5/2003 | Noller et al. |
| 6,595,929 B2 | 7/2003 | Stivoric et al. |
| 6,600,418 B2 | 7/2003 | Sainati et al. |
| 6,605,038 B1 | 8/2003 | Teller et al. |
| 6,611,782 B1 | 8/2003 | Wooster et al. |
| 6,611,789 B1 | 8/2003 | Darley |
| 6,617,962 B1 | 9/2003 | Horwitz et al. |
| 6,623,427 B2 | 9/2003 | Mandigo |
| 6,633,743 B1 | 10/2003 | Berlinsky |
| 6,665,803 B2 | 12/2003 | Osborn et al. |
| 6,671,567 B1 | 12/2003 | Dwyer et al. |
| 6,714,121 B1 | 3/2004 | Moore |
| 6,716,139 B1 | 4/2004 | Hosseinzadeh-Dolkhani et al. |
| 6,728,531 B1 | 4/2004 | Lee et al. |
| 6,731,312 B2 | 5/2004 | Robbin |
| 6,735,630 B1 | 5/2004 | Gelvin et al. |
| 6,748,902 B1 | 6/2004 | Boesch et al. |
| 6,772,212 B1 | 8/2004 | Lau et al. |
| 6,790,178 B1 | 9/2004 | Mault et al. |
| 6,794,566 B2 | 9/2004 | Pachet |
| 6,799,226 B1 | 9/2004 | Robbin et al. |
| 6,801,964 B1 | 10/2004 | Mahdavi |
| 6,813,586 B1 | 11/2004 | Vock et al. |
| 6,823,225 B1 * | 11/2004 | Sass ................................ 700/94 |
| 6,825,777 B2 | 11/2004 | Vock et al. |
| 6,845,398 B1 | 1/2005 | Galensky et al. |
| 6,856,934 B2 | 2/2005 | Vock et al. |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,885,971 B2 | 4/2005 | Vock et al. |
| 6,898,550 B1 | 5/2005 | Blackadar et al. |
| 6,900,732 B2 | 5/2005 | Richards |
| 6,947,995 B2 | 9/2005 | Chang et al. |
| 6,959,259 B2 | 10/2005 | Vock et al. |
| 7,009,517 B2 | 3/2006 | Wood |
| 7,030,735 B2 | 4/2006 | Chen |
| 7,042,360 B2 | 5/2006 | Light et al. |
| 7,046,230 B2 | 5/2006 | Zadesky et al. |
| 7,054,784 B2 | 5/2006 | Flentov et al. |
| 7,062,225 B2 | 6/2006 | White |
| 7,064,669 B2 | 6/2006 | Light et al. |
| 7,065,342 B1 | 6/2006 | Rolf |
| 7,072,789 B2 | 7/2006 | Vock et al. |
| 7,076,556 B1 | 7/2006 | Brock et al. |
| 7,084,921 B1 | 8/2006 | Ogawa |
| 7,092,846 B2 | 8/2006 | Vock et al. |
| 7,146,437 B2 | 12/2006 | Robbin et al. |
| 7,171,331 B2 | 1/2007 | Vock et al. |
| 7,174,277 B2 | 2/2007 | Vock et al. |
| 7,200,517 B2 | 4/2007 | Darley et al. |
| 7,234,026 B2 | 6/2007 | Robbin et al. |
| 7,251,454 B2 | 7/2007 | White |
| 7,278,966 B2 | 10/2007 | Hjelt et al. |
| 7,292,867 B2 | 11/2007 | Werner et al. |
| 7,324,833 B2 | 1/2008 | White et al. |
| 7,444,353 B1 | 10/2008 | Chen et al. |
| 7,454,002 B1 | 11/2008 | Gardner et al. |
| 7,478,146 B2 | 1/2009 | Tervo et al. |
| 7,519,327 B2 | 4/2009 | White |
| 7,680,849 B2 | 3/2010 | Heller et al. |
| 7,778,595 B2 | 8/2010 | White et al. |
| 2001/0041021 A1 | 11/2001 | Boyle et al. |
| 2001/0042107 A1 | 11/2001 | Palm |
| 2002/0002413 A1 | 1/2002 | Tokue |
| 2002/0013784 A1 | 1/2002 | Swanson |
| 2002/0077784 A1 | 6/2002 | Vock et al. |
| 2002/0090912 A1 | 7/2002 | Cannon et al. |
| 2002/0116082 A1 | 8/2002 | Gudorf |
| 2002/0161865 A1 | 10/2002 | Nguyen |
| 2002/0164973 A1 | 11/2002 | Janik et al. |
| 2002/0173273 A1 | 11/2002 | Spurgat et al. |
| 2003/0001829 A1 | 1/2003 | Tanizoe et al. |
| 2003/0037254 A1 | 2/2003 | Fischer et al. |
| 2003/0046434 A1 | 3/2003 | Flanagin et al. |
| 2003/0069921 A1 | 4/2003 | Lamming et al. |
| 2003/0074457 A1 | 4/2003 | Kluth |
| 2003/0079038 A1 | 4/2003 | Robbin et al. |
| 2003/0163287 A1 | 8/2003 | Vock et al. |
| 2003/0167318 A1 | 9/2003 | Robbin et al. |
| 2003/0208113 A1 | 11/2003 | Mault et al. |
| 2004/0019671 A1 | 1/2004 | Metz |
| 2004/0024867 A1 | 2/2004 | Kjellberg |
| 2004/0043763 A1 | 3/2004 | Minear et al. |
| 2004/0055446 A1 | 3/2004 | Robbin et al. |
| 2004/0069122 A1 | 4/2004 | Wilson |
| 2004/0086120 A1 | 5/2004 | Akins, III et al. |
| 2004/0104845 A1 | 6/2004 | McCarthy |
| 2004/0162804 A1 | 8/2004 | Strittmatter et al. |
| 2004/0198436 A1 | 10/2004 | Alden |
| 2005/0041631 A1 | 2/2005 | Aerrabotu et al. |
| 2005/0080566 A1 | 4/2005 | Vock et al. |
| 2005/0080915 A1 | 4/2005 | Shoemaker et al. |
| 2005/0097087 A1 | 5/2005 | Punaganti Venkata et al. |
| 2005/0135305 A1 | 6/2005 | Wentink |
| 2005/0152294 A1 | 7/2005 | Yu et al. |
| 2005/0172311 A1 | 8/2005 | Hjelt et al. |
| 2005/0177929 A1 | 8/2005 | Greenwald et al. |
| 2005/0245839 A1 | 11/2005 | Stivoric et al. |
| 2005/0266961 A1 | 12/2005 | Shum et al. |
| 2006/0013414 A1 | 1/2006 | Shih |
| 2006/0068760 A1 | 3/2006 | Hameed et al. |
| 2006/0097847 A1 | 5/2006 | Bervoets et al. |
| 2006/0190577 A1 | 8/2006 | Yamada |
| 2006/0205349 A1 | 9/2006 | Passier et al. |
| 2006/0221788 A1 | 10/2006 | Lindahl et al. |
| 2006/0253736 A1 | 11/2006 | Rudolf et al. |
| 2006/0265503 A1 | 11/2006 | Jones et al. |
| 2007/0028009 A1 | 2/2007 | Robbin et al. |
| 2007/0171910 A1 | 7/2007 | Kumar |
| 2008/0046948 A1 | 2/2008 | Verosub |

FOREIGN PATENT DOCUMENTS

| | | |
|---|---|---|
| EP | 744839 | 11/1996 |
| EP | 898378 | 2/1999 |
| EP | 917077 | 5/1999 |
| EP | 0917893 B1 | 5/1999 |
| EP | 918408 | 5/1999 |
| EP | 982732 | 3/2000 |
| EP | 1076302 | 2/2001 |
| EP | 1289197 | 3/2003 |
| EP | 1455477 | 9/2004 |
| EP | 1536612 | 6/2005 |
| EP | 1566948 | 8/2005 |
| GB | 2384399 | 7/2003 |
| JP | 03-152469 | 6/1991 |
| JP | H6-303279 A1 | 10/1994 |
| JP | H8-6875 | 1/1996 |
| JP | 10-224359 A1 | 8/1998 |
| JP | H10-243048 A1 | 9/1998 |
| JP | 11-242686 | 9/1999 |
| JP | H11-288558 | 10/1999 |
| JP | 11-317061 | 11/1999 |
| JP | 2000-224099 | 8/2000 |
| JP | 2001-312338 | 11/2001 |
| JP | 2001321202 | 11/2001 |
| JP | 2002-076977 | 3/2002 |
| JP | 2002101908 | 4/2002 |
| JP | 2002-152830 A1 | 5/2002 |
| JP | 2004-266748 A1 | 9/2004 |
| JP | 2004-147705 A1 | 5/2005 |
| JP | 2005-527997 A | 9/2005 |
| JP | 2008-536354 A1 | 9/2008 |
| KR | 1999-0073234 | 10/1999 |
| WO | 95/16950 | 6/1995 |
| WO | 98/17032 | 4/1998 |
| WO | 98/54581 | 12/1998 |
| WO | 00/51259 | 8/2000 |

| | | |
|---|---|---|
| WO | 00/54462 | 9/2000 |
| WO | 00/70523 | 11/2000 |
| WO | 00/78170 | 12/2000 |
| WO | 01/01706 | 4/2001 |
| WO | 01/65413 | 9/2001 |
| WO | 02/093272 | 11/2002 |
| WO | 03/024035 A1 | 3/2003 |
| WO | 2004/055637 | 7/2004 |
| WO | 2005/008505 | 7/2005 |
| WO | 2005/109781 | 11/2005 |
| WO | 2006/071364 | 6/2006 |
| WO | 2006/094380 | 9/2006 |
| WO | 2007/022421 | 2/2007 |

OTHER PUBLICATIONS

"Nomad Jukebox," User Guide, Creative Technology Ltd., Version 1, Aug. 2000.

"SoundJam MP Plus Manual, version 2.0" —MP3 Player and Encoder for Macintosh by Jeffrey Robbin, Bill Kincaid and Dave Heller, manual by Tom Negrino, published.By Casady & Greene, Inc., 2000.

Bluetooth PC Headsets—Enjoy Wireless VoTP Conversations: 'Connecting' Your Bluetooth Headset With Your Computer, Bluetooth PC Headsets; downloaded on Apr. 29, 2006 fromhttp://www.bluetoothpcheadsets.com/connect.htm.

Creative MuVo TX 256 MB, T3 Magazine, Aug. 17, 2004, http://www.t3.co.uk/reviews/entertainment/mp3_player/creative_muvo_tx_256mb [downloaded Jun. 6, 2006].

Digital Still Cameras—Downloading Images to a Computer, Mimi Chakarova et al., Multi-Media Reporting and Convergence, 2 pgs., undated.

"How to Pair a Bluetooth Headset & Cell Phone", About.com; downloaded on Apr. 29, 2006 from http://mobileoffice.about.com/od/usingyourphone/ht/blueheadset_p.htm.

"Sony Ericsson to introduce Auto pairing to improve Bluetooth connectivity between headsets and phones", Sep. 28, 2005 Press Release, Sony Ericsson Corporate; downloaded on Apr. 29, 2006 from.http://www. sonyerics son. com/spg j sp?cc=glob al&lc=en&ver=4001& tempi ate=pc3 1 1 &z . . . .

512MB Waterproof MP3 Player with FM Radio & Built-in Pedometer, Oregon Scientific, downloaded on Jul. 31, 2006 fromhttp://www2.oregonscientific.com/shop/product.asp?cid=4&scid=11&pid=581.

Adam C. Engst, "SoundJam Keeps on Janunin'," Jun. 19, 2000,http://db.tidbits.com/oetbits.acgi?tbart=05988.

Andrew Birrell, "Personal Jukebox (PJB)," Oct. 13, 2000,http://birrell.org/andrew/talks/pib-overview.ppt.

Apple iPod Technical Specifications, iPod 20GB and 60GB Mac + PC, downloaded from http://www.apple.com/ipod/color/specs.html on Aug. 8, 2005.

Compaq, "Personal Jukebox," Jan. 24, 2001 http://research.compaq.com/SRC/pjb/.

Creative: "Creative Nomad MuVo TX," www.creative.com, Nov. 1, 2004, http://web.archive.org/web/20041024175952/www.creative.com/products/pfriendly. a sp?product=9672 [downloaded Jun. 6, 2006].

CREATIVE: "Creative NOMAD MuVo," www.creative.com, Nov. 1, 2004, http://web.archive.org/web/20041024075901/www.creative.com/products/product.as p?category=213&subcategory=215& product=110 [downloaded Jun. 7, 2006].

CREATIVE: "MP3 Player," www.creative.com, Nov. 1, 2004, http://web.archive.org/web/20041024074823/www.creative.com/products/product.as p?category=213&subcategory=216&product=4983 [downloaded Jun. 7, 2006].

De Herrera, Chris, "Microsoft ActiveSync 3.1," Version 1.02, Oct. 13, 2000.

Hart-Daves, Guy, "How to Do Everything with Your IPod & Mini IPod Mini", 2004, McGraw-Hill Professional, p. 33.

iAP Sports Lingo 0x09 Protocol V1.00, May 1, 2006.

Jabra Bluetooth Headset User Manual; GN Netcom A/s, 2005.

Jabra Bluetooth Introduction; GN Netcom A/S, Oct. 2004.

Jabra FreeSpeak BT200 User Manual; Jabra Corporation, 2002.

Miniman, "Applian Software's Replay Radio and Player v1.02," Product review, pocketnow.com, http://www.pocketnow.com/reviews/replay/replay.htm, Jul. 31, 2001.

Musicmatch, "Musicmatch and Xing Technology Introduce Musicmatch Jukebox," May 18, 1998, http://www.musicmatch.com/info/company/press/releases/?year=1998&release=2.

Nonhoff-Arps, et al., "Straßenmusik Portable MP3-Spieler mit USB-Anschluss," CT Magazin Fuer Computer Technik, Verlag Heinz Heise GMBH, Hannover DE, No. 25, Dec. 4, 2000.

Nutzel et al., "Sharing Systems for Future HiFi Systems", The Computer Society, Jun. 2004.

Personal Computer Jukebox (PJB), "Systems Research Center and PAAD," Compaq Computer Corp., Oct. 13, 2000,http://research.compaq.com/SRC/pjb/.

Peter Lewis, "Two New Ways to Buy Your Bits," CNN Money, Dec. 31, 2003, pp. 1-4.

Sastry, Ravindra Wadali. "A Need for Speed: A New Speedometer for Runners", submitted to the Department of Electrical Engineering and Computer Science at the Massachusetts Institute of Technology, May 28, 1999.

SoundJam MP Plus, Representative Screens, published by Casady & Greene, Inc., Salinas, CA, 2000.

Specification Sheet, iTunes 2, Apple Computer, Inc., Oct. 31, 2001.

Steinberg, "Sonicblue Rio Car," Product Review, Dec. 12, 2000, http://electronics.cnet.com/electronics/0-6342420-1304-4098389.html.

Travis Butler, "Archos Jukebox 6000 Challenges Nomad Jukebox," Aug. 13, 2001,http://db.tidbits.com/getbits.acgi?tbart=06521.

Travis Butler, "Portable MP3: The Nomad Jukebox," Jan. 8, 2001,http://db.tidbits.com/getbits.acgi?tbart=06261.

Waterproof Music Player with FM Radio and Pedometer User Manual, Oregon Scientific, 2005.

Cole, George, "The Little Label with an Explosion of Applications", Financial Times, Ltd., 2002, pp. 1-3.

Licking, Special Report: E-Health, "This is the Future of Medicine", Business Week E.Biz, Dec. 11, 2000, pp. 77 and 78 US.

Nobbe, "Olympic Athletes Get a Boost from Technology", *Machine Design*, vol. 60, No. 19, Aug. 25, 1988.

Paradiso et al., Design and Implementation of Expressive Footwear, May 12, 2000, IBM Systems Journal, vol. 39, Nos. 3&4, pp. 511-529.

Paradiso, et al. "Instrumented Footwear for Interactive Dance" Version 1.1, Presented at the XII Colloquium on Musical Informatics, Gorizia, Italy, Sep. 24-26, 1998, pp. 1-4.

Sellers. Gear to Go, Mitch Mandel Photography, Mar. 2001, pp. 61-62.

Sharp, A Sense of the Real World, www.idsystems.com/reader/2000_09/sens0900.htm, Sep. 2000, 4 pages.

Skaloud et al., DGPS-Calibrated Accelerometric System for Dynamic Sports Events, Sep. 19-22, 2000, ION GPS 2000.

Wysocki, Jr., Staff Reporter, "Do Devices Measuring Body Signs Appeal to the Sick or Healthy", Pittsburgh, US.

No author listed, "Your Next . . . ", Newsweek, Jun. 25, 2001, p. 52 US.

No author listed, Wireless Temperature Monitor, www.echo-on.net/mob/, Nov. 20, 2000.

Office Action dated Feb. 18, 2010 in Australian Patent Application No. 2007268239.

European Office Action dated Nov. 5, 2010 in EP Application No. 07 776 768.9.

"Sierra Wireless Announces First Cellular Network Interface Card for Notebook PCs; The AirCard 300 for Windows changes the Way Notebook PC Users Make Wireless Connections," Business Wire, Jun. 21, 1999, 2 pages.

Sierra Wireless advertisement for AirCard 300, in CIO magazine, Oct. 1, 1999, p. 90.

Sierra Wireless press release for AirCard 300, in Network World magazine, Aug. 23, 1999, p. 27.

Specification of the Bluetooth System, Specification vol. 1, v1.0 B, Dec. 1, 1999.

Specification of the Bluetooth System, Specification vol. 2, v1.0 B, Dec. 1, 1999.

Palm-size PC User's Guide, Casio Computer Co, 1999.

Empeg Car User Guide, Empeg Limited, 1999, 19 pages.

Empeg Car, MP3 in your dash, Digital Audio Player User Guide, Empeg Limited, 2000, 50 pages.
Ericsson Inc., Research Disclosure, "Cellular phone with integrated MP3 player," Feb. 1999.
Digital cellular telecommunications system (Phase 2+); General Packet Radio Service (GPRS); Overall description of the GPRS radio interface; Stage 2 (GSM 03.64 version 6.0.1 Release 1997), 56 pages.
Digital cellular telecommunications system (Phase 2+); General Packet Radio Service (GPRS); Overall description of the GPRS radio interface; Stage 2 (GSM 03.64 version 6.1.0 Release 1997), 42 pages.
Cai et al., "General Packet Radio Service in GSM," IEEE Communications Magazine, Oct. 1997, pp. 122-131.
IEEE Standard 802-11, Part 11; Wireless LAN Medium Access Control (MAC) and Physical Layer (PHY) specifications, 459 pages.
HP Jornada 420 palm-size PC User's Guide, Edition 1, 146 pages.
Lind, "The Network Vehicle—a Glimpse into the Future of Mobile Multi-Media," downloaded from IEEE Xplore on Dec. 17, 2009, pp. 121-1 thru 121-8.
Knudsen, "MP3 Linux Players," Linux Journal, online at http://www.linuxjournal.com/article/3420, Jul. 1, 1999.
Menta, "1200 Song MP3 Portable is a Milestone Player," MP3 newswire.net, online at http://www.mp3newswire.net/stories/personaljuke.html, Jan. 11, 2000.
"MP3.com and i-drive.com join forces to store and manage MP3 files," Business Wire, Inc., Oct. 7, 1999.
MP3 Prospectus, Jul. 21, 1999.
"Digital Download Provider Muscimaker.com Partners With Download Directory Listen.com; Offers Nearly 100,000 Downloadable Tracks Via the Online Directory," PR Newswire Association, Inc., Sep. 15, 1999.
"Myplay.com Launches Today; New Online Service Makes Downloading Digital Music Easy for Everyone; Sign up for Free Virtual Locker Get Bonus Tracks from Artists Including Kid Rock, Chirs Rock, Buckcherry Easy Access to your Music Collection for Download to Portable Media Players," PR Newswire Association, Inc., Oct. 13, 1999.
Nokia Press Release, "Nokia 5140 Mobile Phone adds mobility to Outdoor Adventure, Sport and Fitness," online at http://press.nokia.com/PR/200402/932564_5.html, Feb. 2, 2004.
Nokia 9110i User's Manual, Issue 3, 190 pages, copyright 1999.
Nokia Accessories Guide for the 9110 Communicator, Issue 3, 36 pages, copyright 1999.
Creative Nomad Digital Audio Player User Guide, Online Version, 40 pages, Version 1.0, Jun. 1999.
PalmPilot Handbook, 3Com, Copyright 1997, 202 pages.
Qualcomm QCP-1960 User Guide, Apr. 1999, 79 pages.
RealNetworks, RealJukebox Plus Manual, Copyright 1999, 88 pages.
RealPlayer 7 Plus User Manual, Revision 1.1, RealNetworks, inc., 2000, 125 pages.
RealPlayer Plus G2 Manual, Revision 1.1, RealNetworks, Inc., 1998-1999, 84 pages.
Rio 500 Getting Started Guide, for Windows 98 and Macintosh OS 8.6.
Rio PMP300 User's Guide, Diamond Multimedia Systems, Inc., 1998, 28 pages.
Samsung SCH-3500 User's Guide, 111 pages.
Sony, VAIO Notebook Computer User Guide, PCG-731/PCG-735, 1998, 135 pages.
Sony, VAIO Notebook Computer User Guide, PCG-812, 1998, 144 pages.
Sony, VAIO Notebook Computer User Guide, PCG-838, 1999, 121 pages.
Sony Notebook Computer Service Manual, PCG-723/729, Sony Corporation, 1998.
Sony Notebook Computer Service Manual, PCG-731/735/737, Sony Corporation, 1998.
Sony Notebook Computer Service Manual, PCG-812/818, Sony Corporation, 1998.
Sony Notebook Computer Service Manual, PCG-838, Sony Corporation, 1999.
Sony Notebook Computer Service Manual, PCG-717/719, Sony Corporation, 1997.
SoundJam MP Digital Audio System User Guide, Mac Utility, 1999, 52 pages.
Digital StarTAC Wireless Telephone User Manual, Motorola, Mar. 1999, 199 pages.
"Visteon: for Your Listening Pleasure—Any Music, Any Time, Anywhere," PRNewswire, Jan. 5, 2000.
NCKCN Windows 98 Second Edition Guide, http://www.nckcn.com/NCKCN/ie5/win98se/win982e.htm, downloaded Aug. 18, 2010.
Yamaha Music Sequencer QY70 Owner's Manual, 252 pages.
Yamaha QY Data Filer Owner's Manual, 30 pages.
Office Action in corresponding Japanese Application No. 2009-512018, mailed Apr. 5, 2011.
Universal Serial Bus Specification, Rev. 2.0, Apr. 27, 2000 (650 pages).
3GPP TS 25.402 V7.0.0, Mar. 24, 2006, 46 pages.

* cited by examiner

COMMUNICATION PROTOCOL FOR USE WITH PORTABLE ELECTRONIC DEVICES

CROSS-REFERENCES TO RELATED APPLICATIONS

This application is a division of U.S. patent application Ser. No. 11/439,521 filed on May 22, 2006, now U.S. Pat. No. 8,073,984, the disclosure of which is incorporated by reference herein in its entirety for all purposes.

This application is related to U.S. Provisional Patent Application No. 60/802,889, filed May 22, 2006, and entitled "ACTIVITY MONITORING SYSTEM", which is hereby incorporated by reference herein.

BACKGROUND

1. Field of the Invention

The present invention relates to electrical devices and, more particularly, to electrical devices, such as media players, that communicate with external devices.

2. Description of the Related Art

A media player stores media assets, such as audio tracks, that can be played or displayed on the media player. One example of a portable media player is the iPod® media player, which is available from Apple Computer, Inc. of Cupertino, Calif. Often a media player acquires its media assets from a host computer that serves to enable a user to manage media assets. The host computer can execute a media management application to acquire and manage media assets. One example of a media management application is iTunes® produced by Apple Computer, Inc.

Portable media players, such as MP3 players, are able to play music for users often via earphones or a headset. A portable media player typically includes one or more connectors or ports that can be used to interface to the portable media player. For example, the connector or port can enable the portable media player to couple to a host computer, be inserted into a docking system, or receive an accessory device. Typically, portable media players are dedicated to playing media. However, there exist today various different types of accessory devices that can be coupled to portable media players. For example, a remote control can be connected to the connector or port to allow the user to remotely control the portable media player. As another example, an automobile can include a connector and the portable media player can be inserted onto the connector such that an automobile media system can interact with the portable media player. As still another example, a microphone accessory device can be connected to a portable media player to enable voice recording. Yet still another example is a FM radio controller accessory that includes a FM tuner and a controller. Still yet another example is a camera connector that connects to a portable media player as well as a camera (via USB) and serves to facilitate transfer of images from the camera to the portable media player.

Currently, portable media players can interact with attached accessories in limited ways. However, as accessories become more complex and/or more integrated with operation of portable media players, more sophisticated interaction with accessories is required. Thus, there is a need for improved techniques to enable portable media players to communicate with accessory devices in accordance with a controlled protocol.

SUMMARY

The invention relates to improved techniques for communicating between a portable electronic device and an accessory (or auxiliary) device. The accessory device can augment or supplement the functionality or capabilities of the portable electronic device. For example, in one embodiment, the accessory device can provide wireless communication capabilities to the portable electronic device. In one embodiment, the portable electronic device pertains to a portable media player and thus provide media data for storage, playback or transmission. In one embodiment, the accessory device is attachable to the portable electronic device.

The invention can be implemented in numerous ways, including as a method, system, device, apparatus (including graphical user interface), or computer readable medium. Several embodiments of the invention are discussed below.

As a method for communicating between a portable electronic device and an accessory device, one embodiment of the invention includes at least the acts of: issuing a device capabilities request to the accessory device; receiving a device capabilities response from the accessory device; and subsequently interacting with the accessory device based on the device capabilities.

As a computer readable medium including at least computer program code for communicating between the portable electronic device and an auxiliary device operatively connectable thereto, one embodiment of the invention includes at least: computer program code for issuing a device capabilities request to the accessory device; computer program code for receiving a device capabilities response from the accessory; computer program code for issuing a device mode setting request to the accessory device, the device mode setting request being used to set an operational mode of the accessory device; computer program code for issuing a set filter request to the accessory device, the set filter request being used to configure network filtering at the accessory device; and computer program code for subsequently interacting with the accessory device based on the device capabilities, the operational mode and the network filtering.

As a computer readable medium including at least computer program code for communicating between the portable electronic device and an auxiliary device operatively connectable thereto, another embodiment of the invention includes at least: computer program code for issuing a device capabilities request to the accessory device; computer program code for receiving a device capabilities response from the accessory; computer program code for issuing a set filter request to the accessory device, the set filter request being used to set configure network filtering at the accessory device; and computer program code for subsequently interacting with the accessory device based on the device capabilities and the network filtering.

As a computer readable medium including at least computer program code for communicating between the portable electronic device and an auxiliary device operatively connectable thereto, still another embodiment of the invention includes at least: computer program code for issuing a set filter request to the accessory device, the set filter request being used to set configure network filtering at the accessory device; and computer program code for subsequently operating interaction with the accessory device based on the network filtering.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION

The invention relates to improved techniques for communicating between a portable electronic device and an accessory (or auxiliary) device. The accessory device can augment or supplement the functionality or capabilities of the portable electronic device. For example, in one embodiment, the accessory device can provide wireless communication capabilities to the portable electronic device. In one embodiment, the portable electronic device pertains to a portable media player and thus provide media data for storage, playback or transmission. In one embodiment, the accessory device is attachable to the portable electronic device.

The invention is particularly well suited for use in monitoring physiological data, such as exercise data (e.g., run data). In one embodiment, an accessory device couples to a portable electronic device and receives physiological data from a remote sensor in a wireless manner. The portable electronic device can then communicate with the accessory device to acquire the physiological data from the accessory device. Thereafter, the portable electronic device can store, process and/or display physiological related information. The physiological monitoring is normally of a person, who is typically the user of the portable electronic device.

Embodiments of the invention are discussed below with reference to FIGS. 1-6D. However, those skilled in the art will readily appreciate that the detailed description given herein with respect to these figures is for explanatory purposes as the invention extends beyond these limited embodiments.

Figure 1:
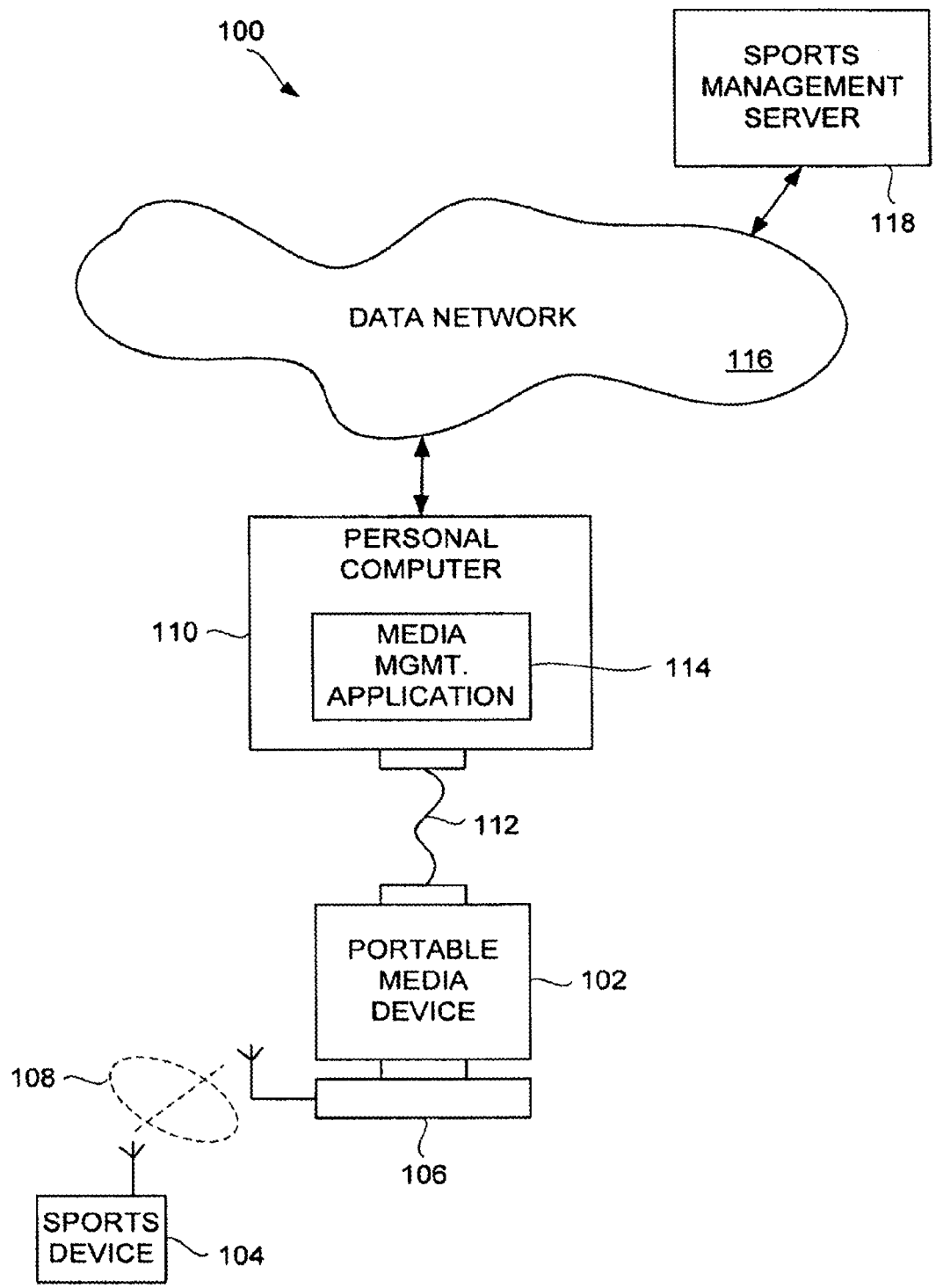
FIG. 1 is a block diagram of a sports monitoring system according to one embodiment of the invention.

FIG. 1 is a block diagram of a sports monitoring system 100 according to one embodiment of the invention. The sports monitoring system 100 is an electronic system that enables sports related information to be acquired, stored, analyzed, presented and shared.

The sports monitoring system 100 includes a portable media device 102. The portable media device 102 is capable of storing and playing media for its user. For example, the portable media device 102 can output (e.g., play) audio or video. The sports monitoring system 100 also includes a sports device 104. The sports device 104 is, for example, a pedometer, a heart rate monitor, etc. The sports device 104 includes one or more sensors that acquire sports related data.

The sports device 104 also includes wireless transmission capability so that the sports related data can be transmitted to the portable media device 102. In particular, the portable media device 102 includes a wireless interface accessory 106. The wireless interface accessory 106 includes a wireless transceiver so that the wireless interface accessory 106 can receive the sports related data being transmitted by the sports device 104 by way of a wireless connection through a personal wireless network 108. The portable media device 102 can receive the sports related data from the sports device 104 via the wireless interface accessory 106 and can then operate to process and store the sports related data at the portable media device 102.

The sports monitoring system 100 also includes a personal computer 110. The portable media device 102 can be electrically connected to the personal computer 110 by way of a cable 112. The cable 112 can, for example, be a Firewire or USB cable. Alternatively, the cable 112 can be replaced with a wireless link. Although the portable media device 102 is not normally electrically connected to the personal computer 110, the electrical connection when present facilitates information exchange between the portable media device 102 and the personal computer 110.

The personal computer 110 includes a media management application 114. The media management application 114, in one embodiment, can not only manage the media assets stored on the personal computer 110, but can also store and manage sports related data. In one embodiment, the media management application 114 can operate to cause the sports related data stored on the portable media device 102 to be copied to the personal computer 110. Thereafter, the sports related data can be analyzed at the personal computer 110 and/or made available to the user of the personal computer 110. In addition, the sports monitoring system 100 can facilitate the personal computer 110 coupling to a data network 116. The data network 116 can represent a global or Wide Area network, such as the World Wide Web (or the Internet). When the personal computer 110 is coupled to the data network 116, the sports related data present at the personal computer 110 can be transferred to a sports management server 118. At the sports management server 118, the sports related data can be further analyzed and/or processed to facilitate usefulness of the data. The sports management server 118 supports storage and analysis of sports related data from a large number of different portable media devices and/or personal computers. Hence, the sports management server 118 can also compare the sports related data from different users. The sports management server 118 can also provide a website that can be accessed by a network browser operating on the personal computer 110 or other computing device to access sports related information or other information made available via the website.

The sports device 104 illustrated in FIG. 1 can take a variety of different forms. In one embodiment, the sports device is a sensor-based device. One example of a sensor-based device is a pedometer.

Figure 2:
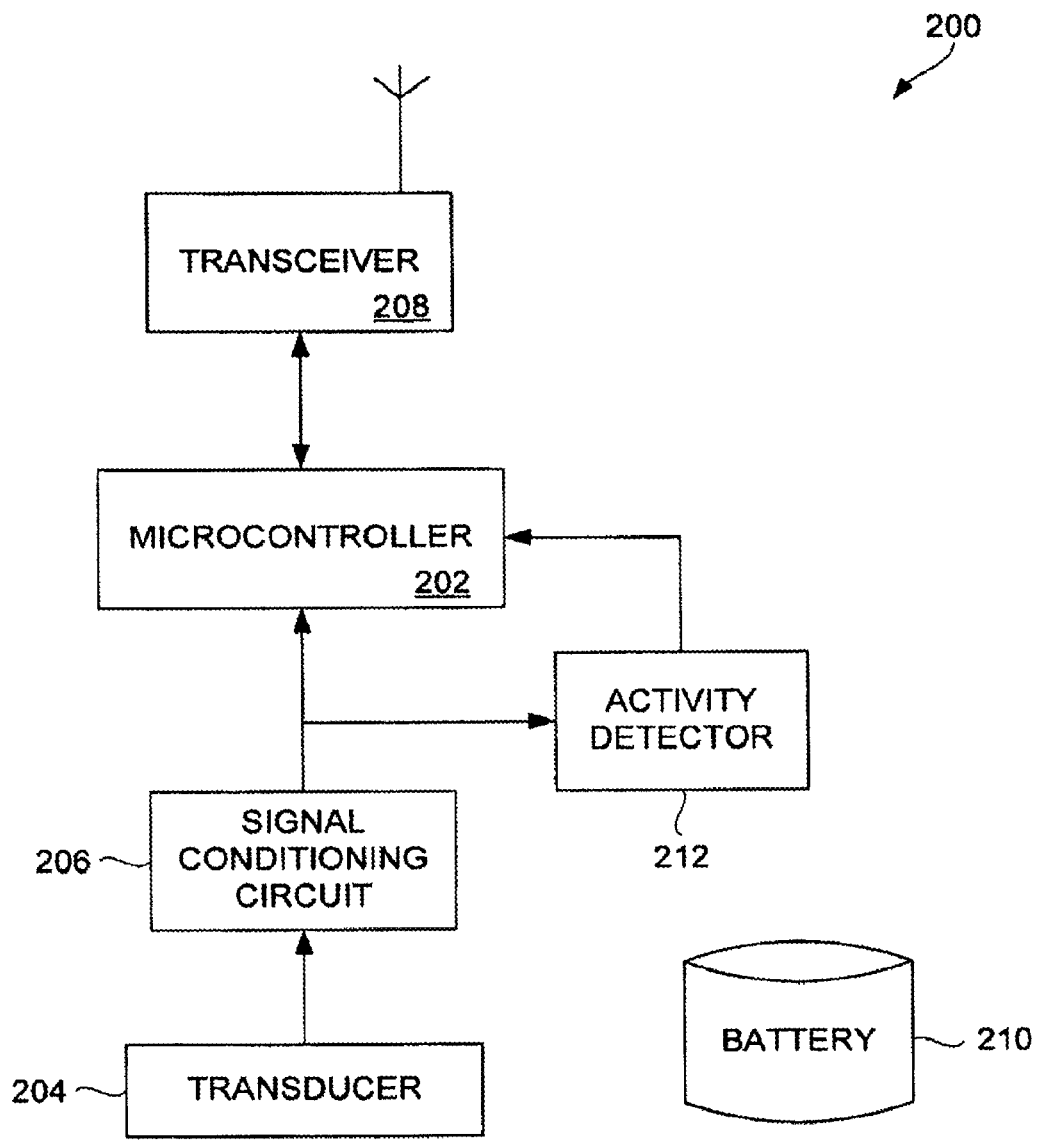
FIG. 2 illustrates a block diagram of a sports device according to one embodiment of the invention.

FIG. 2 illustrates a block diagram of a sports device 200 according to one embodiment of the invention. The sports device 200 is, for example, suitable for use as the sports device 104 illustrated in FIG. 1.

The sports device 200 includes a microcontroller 202 that controls the overall operation of the sports device 200. The sports device 200 also includes a transducer 204 that acquires raw sports data. As an example, the transducer 204 can pertain to a piezo-electric device (e.g., piezo-electric pedometer). With a piezo-electric device, electrical signals associated with pressure applied to the transducer 204 are produced as a user of the sports device walks or runs. In one embodiment, the sports device 200 can be embedded within a shoe, such as within a sole of a shoe. A signal conditioning circuit 206 filters and/or amplifies the raw sports data supplied by the transducer 204. The resulting conditioned sports data is then supplied to the microcontroller 202. The microcontroller 202 include memory that can store the conditioned sports data.

The sports device 202 also includes a transceiver 208 to transmit the conditioned sports data to a portable media device, such as the portable media device 102 via the wireless interface accessory 106 illustrated in FIG. 1. Since the sports device 200 need not receive data back from the portable media device 102, the transceiver 208 can alternatively be a transmitter.

Still further, the sports device 200 is battery powered by a battery 210. In one embodiment, the battery 210 is not replaceable by the user of the sports device 200. Accordingly, the sports device 200 is designed to operate in a low power manner. In this regard, the microcontroller 202 is a low power design and can be placed in a sleep/hibernate mode when sports data is not being acquired. In one embodiment, the sports device 200 includes an activity detector 212. The activity detector 212 can monitor the transducer 204 or the signal conditioning circuit 206 to determine whether the sports data is indicating that there is some sports related activity (e.g., running, walking, etc.) being undertaken. When the activity detector 212 determines that there is no sports related activity, the activity detector 212 can cause or signal the microcontroller 202 to enter a low power mode (i.e., sleep or hibernate). When the activity detector 212 determines that there is sports related activity while the microcontroller 202 is in the low power mode, the activity detector 212 can cause or signal the microcontroller 202 to awaken to a normal mode.

Figure 3:
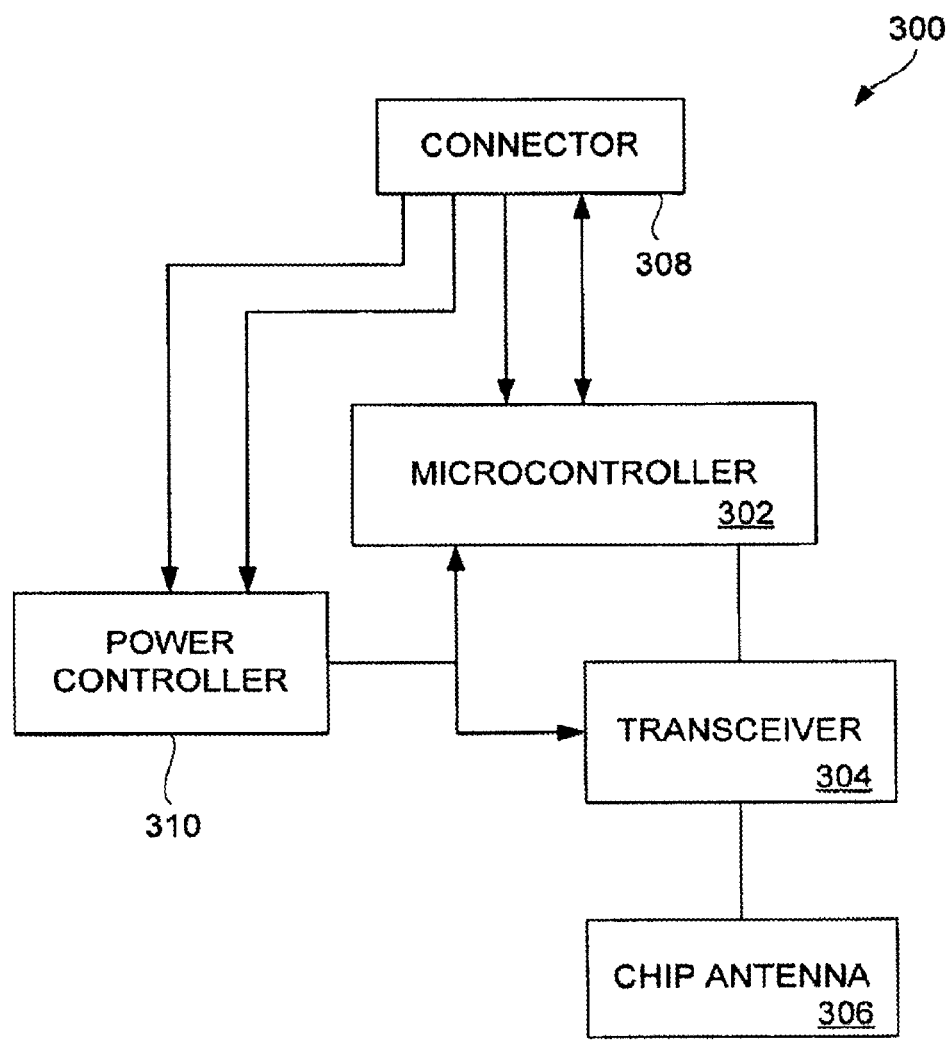
FIG. 3 is a block diagram of a wireless interface accessory according to one embodiment of the invention.

FIG. 3 is a block diagram of a wireless interface accessory 300 according to one embodiment of the invention. The wireless interface accessory 300 is, for example, suitable for use as the wireless interface accessory 106 illustrated in FIG. 1. The wireless interface accessory 300 includes a microcontroller 302 that controls the overall operation of the wireless interface accessory 300. The wireless interface accessory 300 also includes a transceiver 304 and a chip antenna 306. The transceiver 304 operates to wirelessly communicate with the counterpart device, such as a sports device, to receive sports related data. The sports related data is then temporarily stored in memory provided with the microcontroller 302 and then forwarded to a portable media device via a connector 308. The connector 308 can couple with a counterpart connector associated with the portable media device. The microcontroller 302 can also store some user data, including calibration data, as well as sports data, including as data summaries, workout data, etc. The wireless interface accessory 300 can also includes a power controller 310. The power controller 310 couples to a power source and ground from the connector 308. The power controller 310 typically converts the incoming voltage level to a different voltage level to be utilized by the microcontroller 302 and the transceiver 304.

Figure 4A:
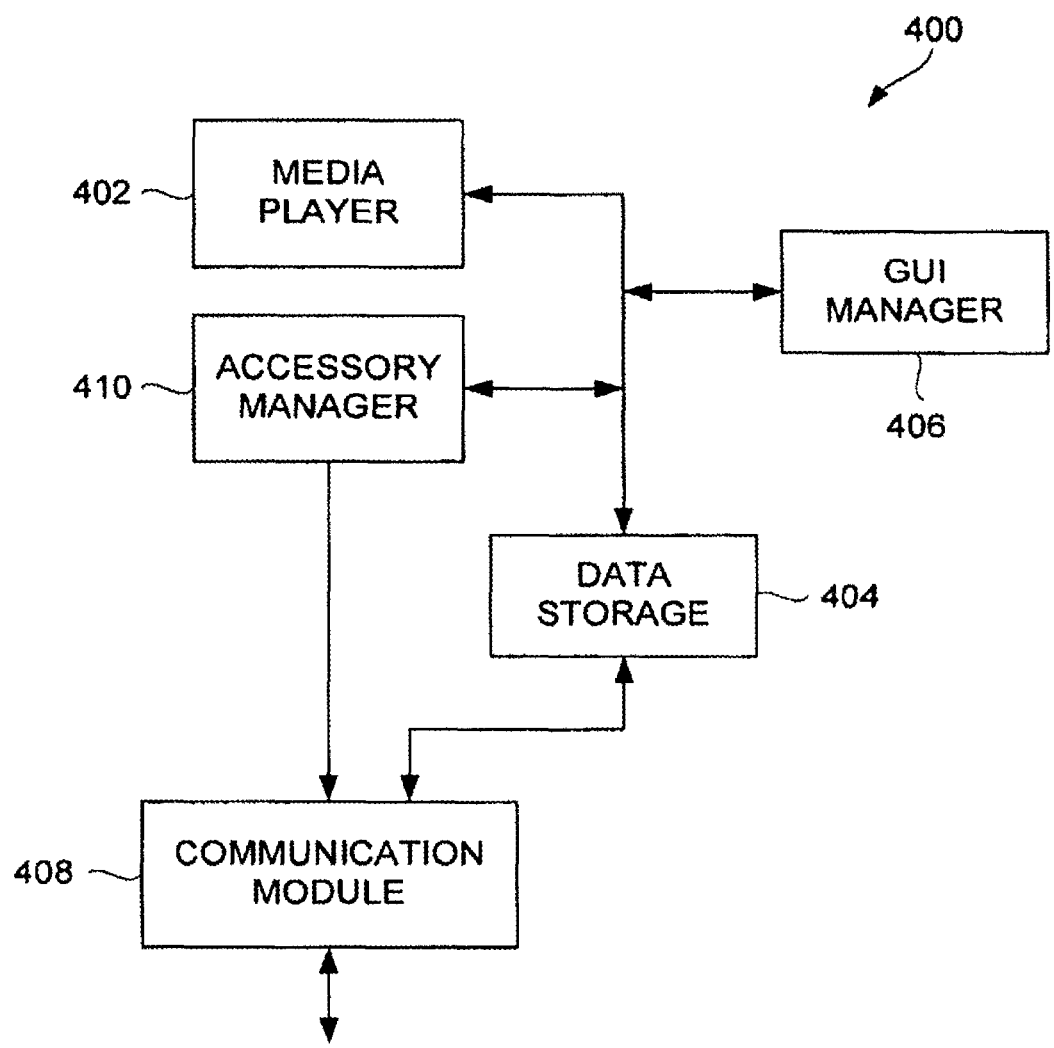
FIG. 4A is a block diagram of an arrangement of functional modules utilized by a portable media device.

FIG. 4A is a block diagram of an arrangement 400 of functional modules utilized by a portable media device. The portable media device can, for example, be the portable media device 102 illustrated in FIG. 1. The arrangement 400 includes a media player 402 that is able to output media for a user of the portable media device but also store and retrieve data with respect to a data storage 404. The arrangement 400 also includes a graphical user interface (GUI) manager 406. The GUI manager 406 operates to control information being provided to and displayed on a display device. The arrangement 400 also includes a communication module 408 that facilitates communication between the portable media device and an accessory device. Still further, the arrangement 400 includes an accessory manager 410 that operates to authenticate and acquire data from an accessory device that may be coupled to the portable media device. For example, the accessory device can be a wireless interface accessory, such as the wireless interface accessory 106 illustrated in FIG. 1 as being coupled to the portable media device 102.

Figure 4B:
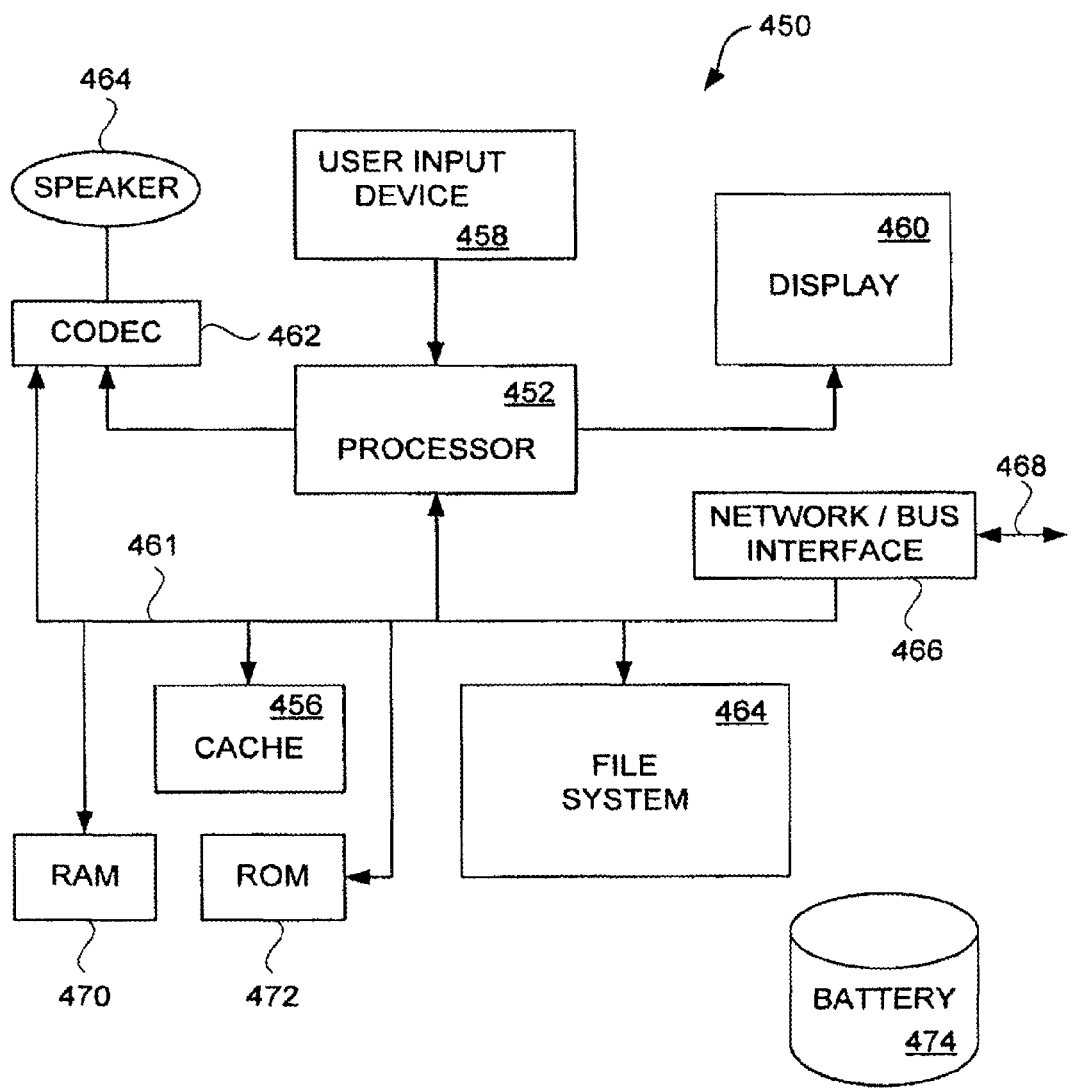
FIG. 4B is a block diagram of a media player suitable for use with the invention.

FIG. 4B is a block diagram of a media player 450 suitable for use with the invention. The media player 450 illustrates circuitry of a representative portable media device.

The media player 450 includes a processor 452 that pertains to a microprocessor or controller for controlling the overall operation of the media player 450. The media player 450 stores media data pertaining to media items in a file system 454 and a cache 456. The file system 454 is, typically, a storage disk or a plurality of disks. The file system 454 typically provides high capacity storage capability for the media player 450. However, since the access time to the file system 454 is relatively slow, the media player 450 can also include a cache 456. The cache 456 is, for example, Random-Access Memory (RAM) provided by semiconductor memory. The relative access time to the cache 456 is substantially shorter than for the file system 454. However, the cache 456 does not have the large storage capacity of the file system 454. Further, the file system 454, when active, consumes more power than does the cache 456. The power consumption is often a concern when the media player 450 is a portable media player that is powered by a battery 474. The media player 450 also includes a RAM 470 and a Read-Only Memory (ROM) 472. The ROM 472 can store programs, utilities or processes to be executed in a non-volatile manner. The RAM 470 provides volatile data storage, such as for the cache 456.

The media player 450 also includes a user input device 458 that allows a user of the media player 450 to interact with the media player 450. For example, the user input device 458 can take a variety of forms, such as a button, keypad, dial, etc. Still further, the media player 450 includes a display 460 (screen display) that can be controlled by the processor 452 to display information to the user. A data bus 461 can facilitate data transfer between at least the file system 454, the cache 456, the processor 452, and the CODEC 462.

In one embodiment, the media player 450 serves to store a plurality of media items (e.g., songs, podcasts, etc.) in the file system 454. When a user desires to have the media player play a particular media item, a list of available media items is displayed on the display 460. Then, using the user input device 458, a user can select one of the available media items. The processor 452, upon receiving a selection of a particular media item, supplies the media data (e.g., audio file) for the particular media item to a coder/decoder (CODEC) 462. The CODEC 462 then produces analog output signals for a speaker 464. The speaker 464 can be a speaker internal to the media player 450 or external to the media player 450. For example, headphones or earphones that connect to the media player 450 would be considered an external speaker.

The media player 450 also includes a bus interface 466 that couples to a data link 468. The data link 468 allows the media player 450 to couple to a host device (e.g., host computer or power source). The data link 468 can also provide power to the media player 450.

The media player 450 also includes a network/bus interface 466 that couples to a data link 468. The data link 468 allows the media player 450 to couple to a host computer or to accessory devices. The data link 468 can be provided over a wired connection or a wireless connection. In the case of a wireless connection, the network/bus interface 466 can include a wireless transceiver. The media items (media assets) can pertain to one or more different types of media content. In one embodiment, the media items are audio tracks (e.g., songs, audiobooks, podcasts). In another embodiment, the media items are images (e.g., photos). However, in other embodiments, the media items can be any combination of audio, graphical or video content.

Figure 5:
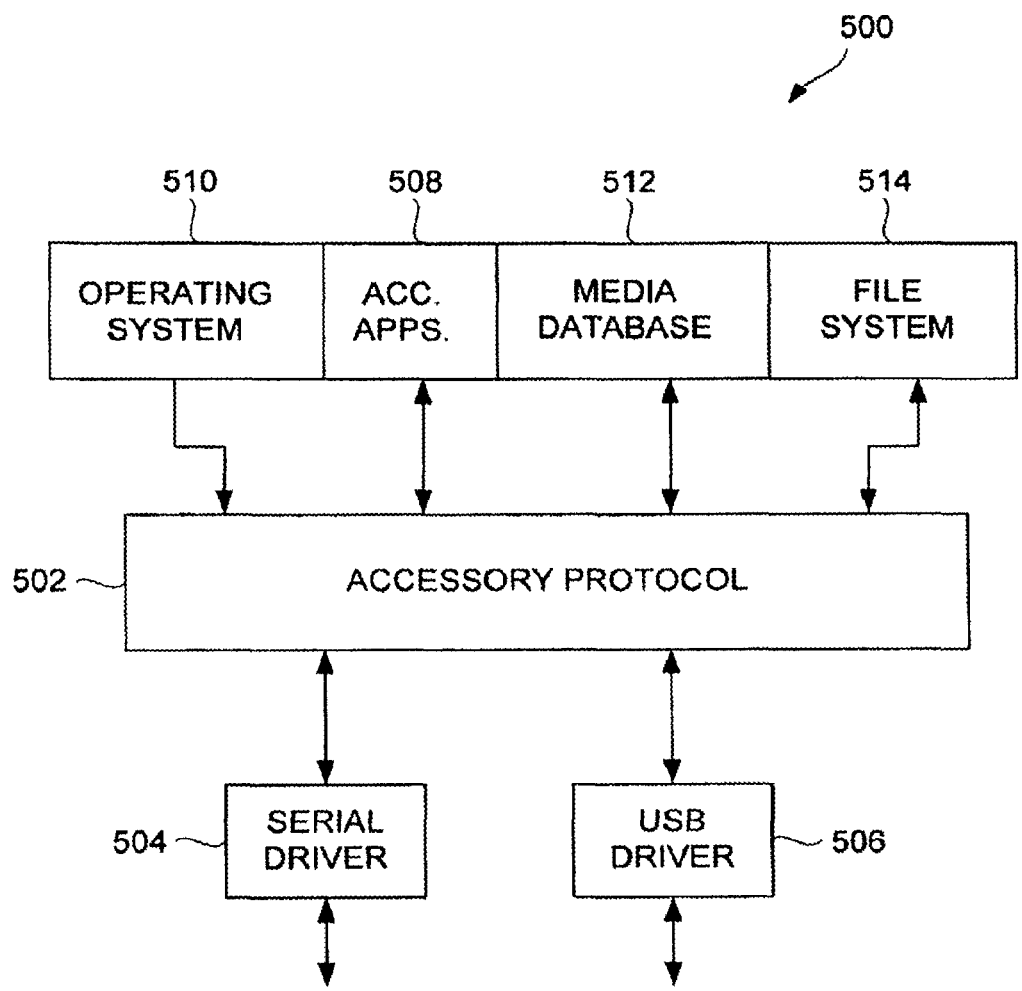
FIG. 5 is a software system according to one embodiment of the invention.
Figure 6A:
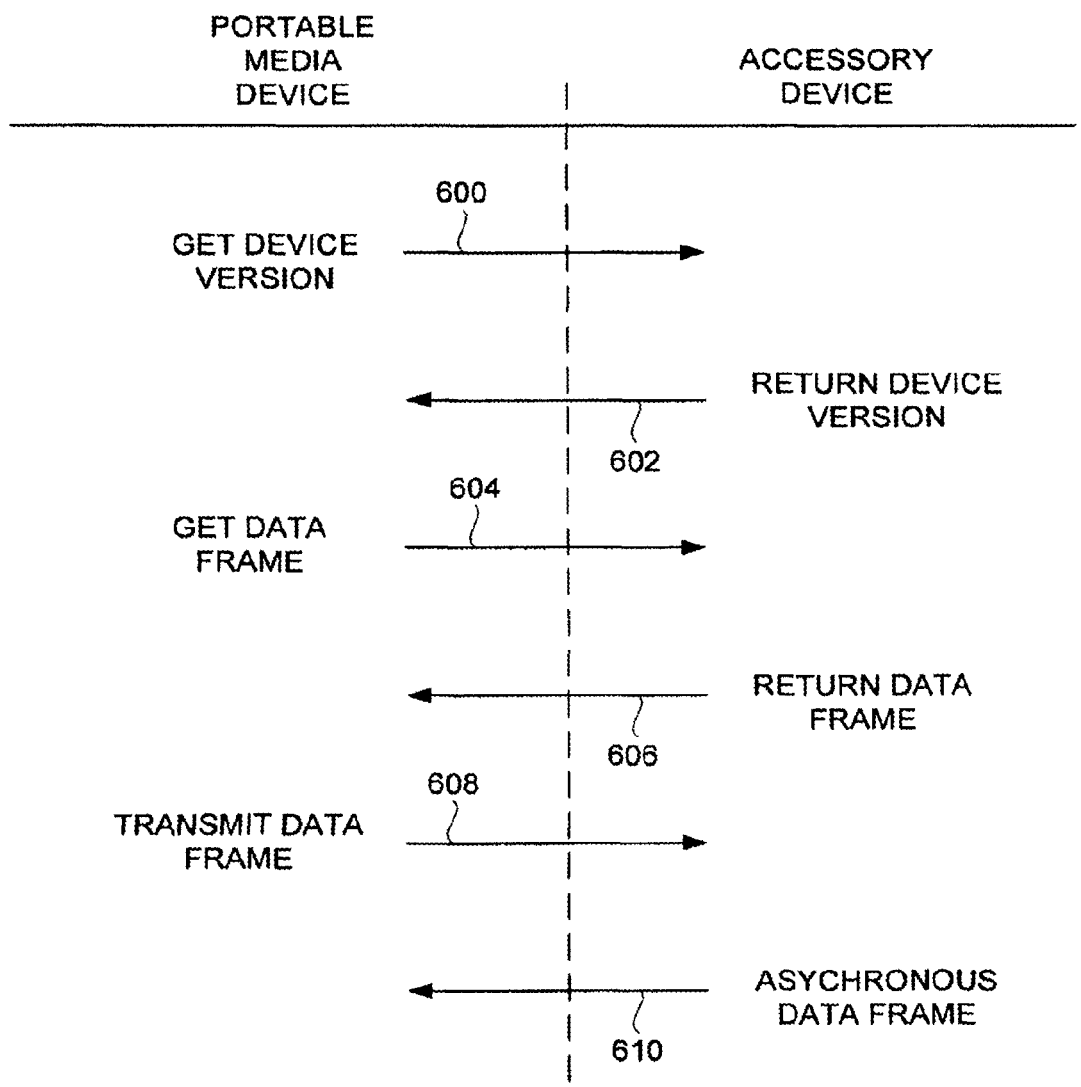
FIGS. 6A-6D are diagrams illustrating various commands of an accessory protocol according to one embodiment of the invention.
Figure 6B:
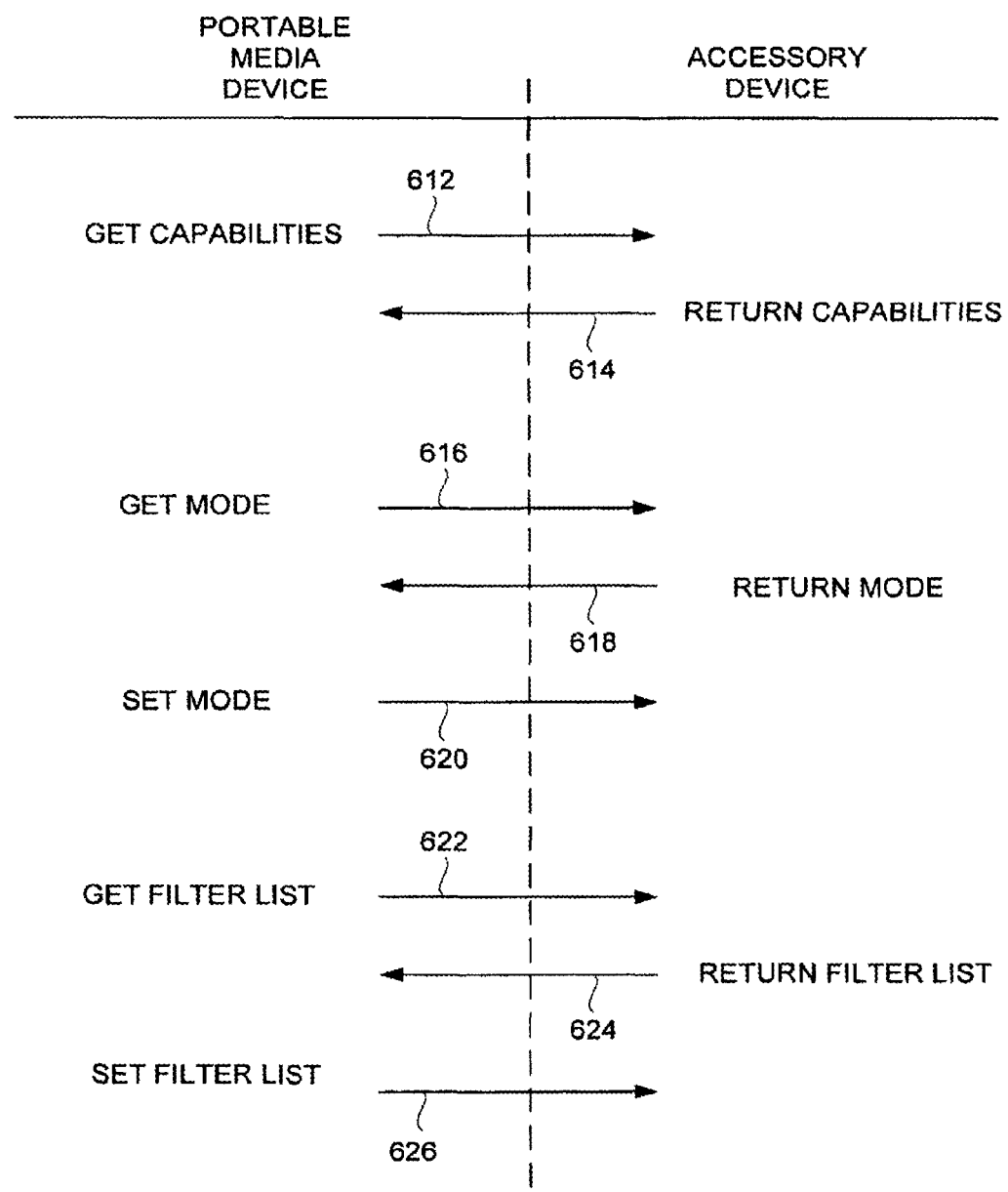
Figure 6C:
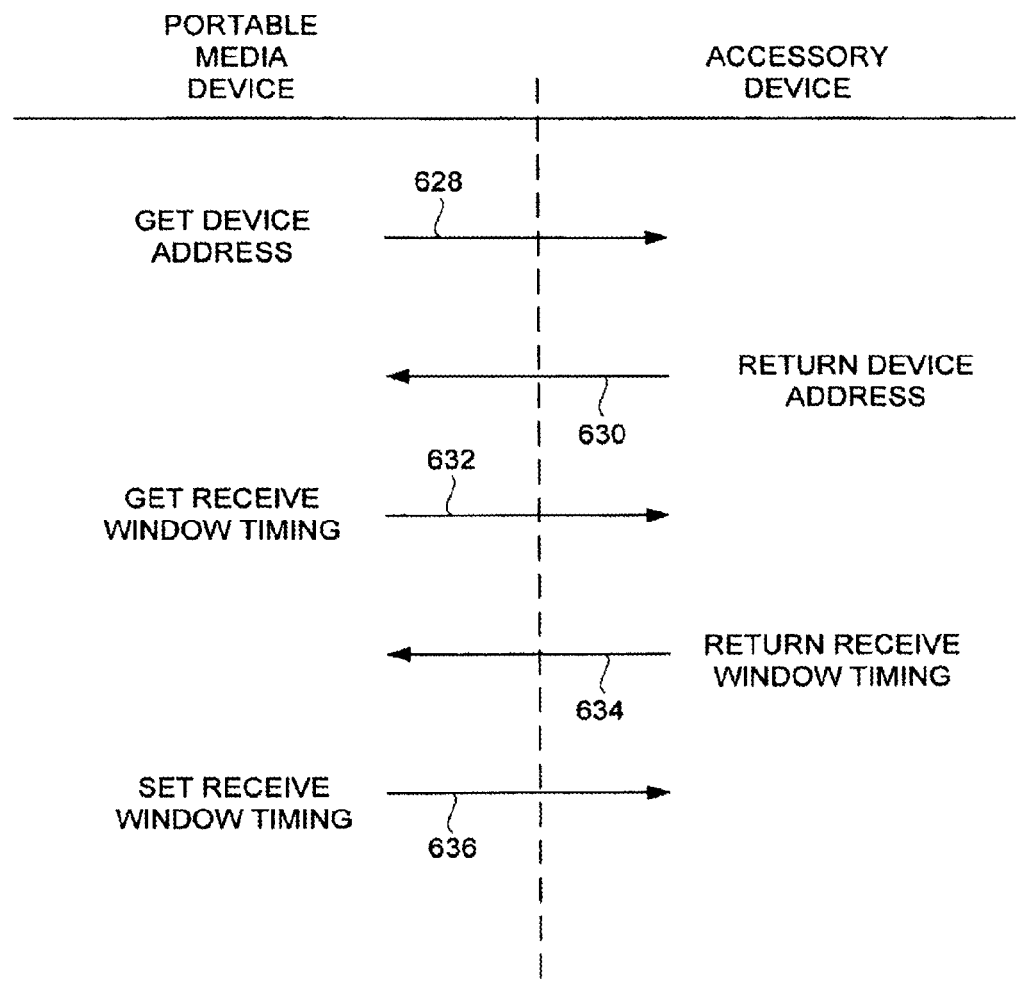
Figure 6D:
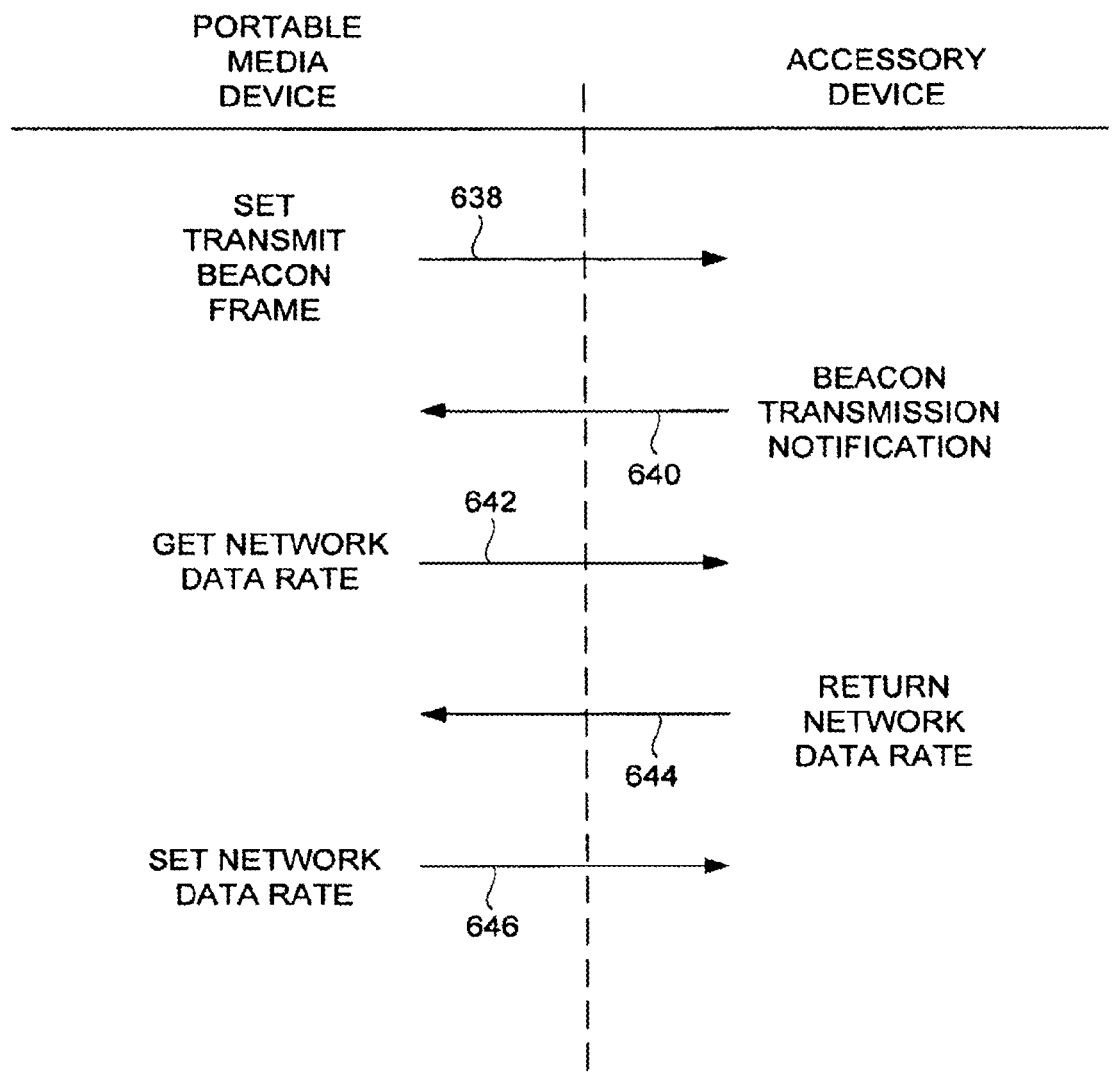

FIG. 5 is a software system 500 according to one embodiment of the invention. The software system 500 illustrates an arrangement of software modules provided within a portable electronic device. For example, the portable electronic device can be the portable media player 102 illustrated in FIG. 1.

The software system 500 includes an accessory protocol 502. The accessory protocol 502 facilitates communication between the portable electronic device, namely, applications, databases and systems internal to the portable electronic device, with an accessory device that connects to the portable electronic device. As an example, the accessory device can pertain to the wireless interface accessory 106 illustrated in FIG. 1. However, any of a wide variety of other the different types of accessory devices can utilize the accessory protocol 502 to facilitate communication between the accessory device and the systems, applications and databases internal to the personal electronic device.

The software system 500 includes, in this embodiment, an operating system 510, accessory applications 508, a media database 512, and a file system 514. As such, the operating system 510 is able to interact with the accessory device by way of the accessory protocol 502. Similarly, the one or more accessory applications 508 that are supported by the portable electronic device can communicate with the accessory device using the accessory protocol 502. The accessory protocol 502 enables the accessory device to read or write data to the media database 512 or the file system 514.

The accessory protocol supports a set of predetermined commands. Through use of these commands, the portable electronic device and the accessory device are able to communicate. In communicating with the accessory device, the accessory protocol 502 outputs commands and data in accordance with the protocol to a driver. The driver, in turn, is used to deliver the commands and data to the accessory device by way of a connection. The driver is also used to receive commands and data from the accessory device. In one embodiment, the connection between the driver(s) and the accessory device is by way of a pair of complementary connectors, one of such connectors being associated with the portable electronic device and the other of the connectors being associated with the accessory device. When the accessory device is connected to the portable electronic device by way of these connectors, the connection between the driver and the accessory device is established. Although the drivers can vary depending upon application, in this particular embodiment shown in FIG. 5, the drivers include a serial driver 504 and a Universal Serial Bus (USB) driver 506. As such, the accessory protocol enables communication between the portable electronic device and the accessory device by way of either a serial data connection, by way of the serial driver 504 or by way of a USB connection using the USB driver 506.

As noted above, communication between the portable electronic device and the accessory device is by way of the accessory protocol. The various commands supported by one embodiment of the accessory protocol are described below with reference to FIGS. 6A-6D.

When a portable media device wants to determine whether its version of the accessory protocol is compatible with the version of the protocol protocol [sic] being utilized by the accessory device, a Get Device Version command 600 can be sent from the portable media device to the accessory device. In response to the Get Device Version command 600, the accessory device will return a Return Device Version command 602 to the portable electronic device. The Return Device Version command 602 being returned can specify the most recent protocol version that the accessory device supports. In one implementation, the Return Device Version command 602 can include an indication of a major version number and a separate indication for a minor version number. Then, assuming that the protocol version at the portable electronic device is not less than the version being utilized by the accessory device, the protocols are compatible.

By use of the protocol, the portable electronic device and the accessory device are able to exchange data. The data can be associated with any system, application, database, etc. affiliated with the portable electronic device or can be affiliated with any data the accessory device might have available. The data exchange can be on a polled basis or on an asynchronous basis. In the case of polling, the portable electronic device can send a Get Data Frame command 604 to the accessory device. According to the protocol, the Get Data Frame command 604 serves to request a data frame be provided back from the accessory device. If the data frame is not available, the accessory device can return an acknowledgment with a failure status indicator. Polling can be used when the accessory device does not support asynchronous data transfer. As discussed below, the capabilities of the accessory device (e.g., supports for asynchronous data transfer) can also be determined utilizing the accessory protocol. In response to the Get Data Frame command 604, the accessory device returns a Return Data Frame command 606. The Return Data Frame 606 provides a data frame that has been received by the accessory device to the portable electronic device. Once a received data frame is provided to the portable electronic device, it can be discarded at the accessory device so that a subsequent Get Data Frame command 604 does not return the same data frame. It should also be noted that the data frames being returned are only those that satisfy a data frame filter list, if such is supported and enabled as discussed in more detail below.

The portable media device can also transmit a data frame to the accessory device using a Transmit Data Frame command 608. Here, the Transmit Data Frame command 608 requests that the accessory device immediately transmit a data frame over a network to a destination device. The Transmit Data Frame command 608 is sent by the portable electronic device to the accessory device when a data frame is to be transmitted. In other words, the Transmit Data Frame command 608 is for asynchronous transmission of a data frame. The end destination for the data frame being transmitted is typically not the accessory device; hence, the accessory device will transmits the data frame to the appropriate destination device. The ability to transfer data asynchronously requires that the capabilities of the accessory device support such asynchronous data transfers.

On the other hand, the accessory device can also transmit a data frame from the accessory device to the portable electronic device using an Asynchronous Data Frame command 610. Here, the source of the data frame being transmitted from the accessory device to the portable electronic device is an external wired/wireless device (e.g., sensor) or an internal device. For successful data transfer, the Asynchronous Data Frame command 610 requires that the accessory device support asynchronous data transfers, that asynchronous data transfers are enabled, and that a data frame filter list is satisfied (if enabled). In the event that these conditions are not met, the accessory device will not forward the data frame to the portable electronic device.

In many cases, it is useful for the portable electronic device to understand the capabilities of the accessory device. Hence, the protocol includes a Get Capabilities command 612 that can be sent from the portable electronic device to the accessory device to request capabilities and thus determine the features available on the accessory device. In response to the Get Capabilities command 612, the accessory device responds with a Return Capabilities command 614. The Return Capabilities command 614 includes data that indicates the capabilities of the accessory device. In one implementation, a bitmask can be utilized to efficiently report to the portable media device the capabilities of the accessory device. For example, in one implementation, the various capabilities of the accessory device that can be reported include the following: power control capability, filtering capability, asynchronous data transfer capability, polled data transfer capability, asynchronous data frame transmission capability, receiver listening mode control capability, receiver listening window timing control capability, synchronous beacon data frame transmission capability, network configurable transmission rate capability, and maximum count of node filters supported.

The accessory device can typically operate in a plurality of different modes. In order for the portable electronic device to know what mode the accessory device is in, the portable electronic device can send a Get Mode command 616 to the accessory device. In response, the accessory device sends Return Mode command 616 back to the portable electronic device. The Return Mode command 618 includes an indication of mode information pertaining to the accessory device. In one embodiment, the mode information can be efficiently provided with the Return Mode command 618 through use of a bitmask. In any case, in one embodiment, the mode information being provided with the Return Mode command 618 can include one or more of the following: a power control state, a filtering state, a polled data transfer control state, data frame transmission control state, an asynchronous data transfer control state, receiver listening mode control state, receiver listening window timing control state, synchronous beacon frame transmission control state, network transmission rate control state, and the like.

Still further, the portable electronic device can set the accessory device into a particular mode. In other words, any of the control states noted above with regard to the mode information can be altered by the portable electronic device by sending a Set Mode command 620 to the accessory device. The accessory device in response to the Set Mode command 620 can send an acknowledgment command back which indicates the status of the command's completion. In one embodiment, the Set Mode command 620 can utilize a bitmask in order to efficiently request one or more particular mode changes at the accessory device. In any case, the Set Mode command 620 can request to set one or more modes with respect to one or more of the following: power control mode, filtering mode, asynchronous data transfer control mode, polled data transfer control mode, data frame transmission control mode, receiver listening control mode, receiver listening window timing control state, synchronous beacon frame transmission control state, network transmission rate control mode, and the like.

In addition, the accessory device can utilize a receiver filter so that only those limited data frames of interest are transmitted from the accessory device to the portable electronic device. This capability is particularly useful for an accessory device that wirelessly receives data frames over a wireless network. In one embodiment, the filter receiver can be implemented using a filter list. The filter list is a list of those node identifiers for which data frames are desired. When filtering is enabled, data frames from nodes not in the list are filtered out (i.e., excluded). The protocol includes a Get Filter List command 622 that can be sent by the portable electronic device to the accessory device to get a list of node identifiers (i.e., filter list). This requires that the accessory device support identifier filtering as determined using the Return Capabilities command 614. In one embodiment, the Get Filter List command 622 can include (i) a starting node identifier entry index in the filter list to read, and (ii) a maximum count of node identifiers to read. In any case, in response to the Get Filter List command 622, a Return Filter List command 624 is provided from the accessory device to the portable electronic device. The Return Filter List command 624 includes a list of node identifiers that are currently present on the accessory device. In one example, the filter list can contain a list of network address entries of nodes from which data frames will be accepted and transferred to the portable electronic device. The information provided with the Return Filter List command 624 can include parameters providing (i) a starting node identifier entry index into the filter list, (ii) the number of the filter node identifiers being returned, and (iii) the filter list itself. In one implementation, the filter list can be provided as an array of network address fields (e.g., filter node identifiers).

Still further, the portable electronic device can also set the one or more node identifiers in the filter list. The filter list includes one or more network address entries pertaining to network nodes from which data frames will be accepted and transferred to the portable electronic device. Hence, when node filtering is enabled, incoming data frames from sources not in the node filter list will be ignored (i.e., not transferred to the portable electronic device). According to the protocol, to alter the filter list at the accessory device, the portable electronic device sends a Set Filter List command 626 to the accessory device. The Set Filter List command 626 enables the portable electronic device to cause modification to the filter list at the accessory device, assuming such filtering is supported by the accessory device. In one embodiment, the Set Filter List command 626 include parameters providing (i) a starting node identifier entry index into the filter list to be set, (ii) the number of the filter node identifiers being set, and (iii) the filter list itself. As previously noted, in one implementation, the filter list can be provided as an array of network address fields (e.g., filter node identifiers). Node filtering using the filter list can be enabled/disabled using the Set Mode command. Node filtering can be disabled when searching for or discovering remote node devices and enabled once the desired remote node devices are found.

Still further, the portable electronic device may desire to transmit data to a destination address by way of the accessory device. In such a case, as well as other cases, a Get Device Address command 628 can be sent from the portable electronic device to the accessory device. This command requests that the accessory device provide its device address that will be thereafter used as a source address for the data frames that might be transmitted by the portable electronic device (since the accessory is the "source" of such transmitted data frames). In response to the Get Device Address command 628, the accessory device sends a Return Device Address command 630 to the portable electronic device. The Return Device Address command 630 includes a destination address associated with the accessory device. Thereafter, if and when the portable electronic device seeks to transmit data via the accessory device, the address associated with the accessory device can be used as the source address for a source address field of one or more outgoing data frames.

To facilitate low-power operation, the portable electronic device can manage or control when the accessory device is listening for incoming data frames over a network. Typically, the network is a small local network, often wireless. In this regard, a listening window is utilized such that the accessory device is actively listening for incoming data frames only during the listening window. At other times, the accessory device is conserving power by not attempting to listen during such times. Hence, the protocol allows the portable electronic device to send a Get Receive Window Timing command 632 to acquire information of the timing window, if any, being utilized. In response, the accessory device should return a Return Receive Window Timing command 634 that contains a timing interval for a listening window (receive window interval) and a duration for the listening window (receive window duration). If for some reason the accessory device does not support listening window timing, an acknowledge command can be returned with a status indication of the same. In one specific example, the receive window interval is the time in milliseconds between two windows when the accessory device starts listening for the received data frames. The receive window duration is the time in milliseconds that the accessory device listens for received data frames after a receive window interval has started. Further, the portable electronic device can operate to set receive window timing on the accessory device. In this regard, the portable electronic device can send a Set Receive Window Timing command 636 from the portable electronic device to the accessory device. The command allows the portable electronic device to configure the receive window interval and duration. Typically, the portable electronic device would configure the receive window timing before enabling the listening window. The listening window can be enabled using, for example, a timing control mode which can be set by a Set Mode command 620.

The protocol also supports the portable media device in setting a transmit beacon data frame and a beacon transmission notifier identifier on the accessory device. A Set Transmit Beacon Frame 638 can be used to set the transmit beacon data frame at the accessory device. The command is enabled if the appropriate capabilities indicator indicates support for beacon transmissions. A Set Mode command 620 can control the transmit beacon which is enabled only after a valid transmit beacon data frame has been set using the Set Beacon Transmit Frame 638. The beacon transmissions can be synchronous in accordance with a beacon transmission interval, assuming synchronous beacon frame transmission is enabled. The Set Transmit Beacon Frame command 638 can include a data frame to be transmitted. In addition, the Set Transmit Beacon Frame command 638 can include timing index information to specify the beacon transmission timing schedule. In addition, the Set Transmit Beacon Frame command 638 can include a beacon transmission notification identifier which controls notification of the portable electronic device when the beacon data frame is transmitted via the accessory device.

After the Set Transmit Beacon Frame 638 has been set successfully and enabled, the accessory device can send a Beacon Transmission Notification command 642 to the portable electronic device when it transmits the beacon data frame, assuming that transmission notification was not disabled and the associated capabilities are supported. The Beacon Transmission Notification command 640, in one embodiment, includes a beacon transmission notification identifier and a beacon transmission timing information. By receiving back the beacon transmission notification identifier, the portable of electronic device is able to determine that a particular beacon data frame has been transmitted.

A beacon is a data frame broadcast by the accessory device at regular intervals. The beacon contents to be broadcast, the time interval between broadcasts, and the option to listen for a period of time after the broadcast are specified in the data frame sent from the portable electronic device to the accessory device using the Set Transmit Beacon Frame command 638.

The beacon can be used to establish a wireless communications link between the portable electronic device and the accessory device. The beacon data frame could be configured to listen for a short period of time after the beacon is broadcast. If the accessory device wants to communicate with the portable electronic device, it can wait for the beacon data frame to be broadcast, and then it can send a data frame to the portable electronic device. A beacon could also be used to send available data from the portable electronic device to a listening accessory device. For example, when the portable electronic device is a portable media player, a beacon can be used to send media data, such as current track index, track position, track name or play state to another device (accessory device, other portable electronic device, etc.).

Still further, the protocol includes a Get Network Data Rate command 642. The Get Network Data Rate command 642 can be sent by the portable electronic device to the accessory device to get the current network transmission rate from the accessory device. Typically, the network involved is a wireless network, but in other embodiments the network can be a wired network. In the event that configurable data rate capabilities are not supported, this operation is unavailable. In response to the Get Network Data Rate command 642, the accessory device returns a Return Network Data Rate command 644. The Return Network Data Rate command 644 includes the current network transmission rate setting for the accessory device. A Set Network Data Rate command 646 is also provided to allow the portable electronic device to set a network transmission rate at the accessory device. Assuming that the requested network data rate is supported by the accessory device and that the accessory device permits configuration of the network transmission rates, the Set Network Data Rate command 646 allows the portable electronic device to set the network data rate at the accessory to one of a plurality of different transmission data rates.

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method comprising:
   sending, by a portable media device to an accessory, a first command requesting information about asynchronous data transfer capabilities of the accessory;

receiving, by the portable media device from the accessory, information about the asynchronous data transfer capabilities of the accessory;

sending, by the portable media device to the accessory, a second command requesting an address associated with the accessory;

receiving, by the portable media device from the accessory, the address associated with the accessory;

sending, by the portable media device to the accessory, a third command, the third command including a data frame and a destination address for a destination device; and instructing, by the portable media device, the accessory to transmit the data frame to the destination device, wherein a source address assigned to the data frame transmitted to the destination device is the address associated with the accessory.

2. The method of claim 1 wherein the address associated with the accessory is a network address.

3. The method of claim 1 further comprising:
receiving, by the portable media device from the accessory, another data frame, wherein the other data frame is originated by the destination device.

4. A portable media device communicably coupled to an accessory, the portable media device comprising:
a processor; and
a network interface coupled to the processor,
wherein the processor in conjunction with the network interface is configured to:
receive information about asynchronous data transfer capabilities of the accessory;
send a command to the accessory requesting an address associated with the accessory;
receive the address associated with the accessory;
send a second command to the accessory, the second command including a first data frame and a destination address for a destination device; and
instruct the accessory to transmit the first data frame to the destination device, wherein a source address assigned to the first data frame transmitted to the destination device is the address associated with the accessory.

5. The portable media device of claim 4 wherein the processor in conjunction with the network interface is further configured to receive a second data frame from the accessory device, wherein the second data frame originates at the destination device.

6. The portable media device of claim 4 wherein the portable media device receives the information about asynchronous data transfer capabilities of the accessory in response to a capabilities command sent by the portable media device to the accessory.

7. A method comprising:
receiving, by an accessory from a portable media device, a first command requesting information about asynchronous data transfer capabilities of the accessory;

sending, by the accessory to the portable media device, information about the asynchronous data transfer capabilities of the accessory;

receiving, by the accessory from the portable media device, a second command, the second command including a data frame and a destination address for a destination device, wherein a source address for the data frame is an address of the portable media device;

receiving an instruction, by the accessory from the portable media device, to transmit the data frame to the destination device;

replacing, by the accessory, the address of the portable media device with an address of the accessory; and transmitting, by the accessory to the destination device, the data frame received from the portable media device, wherein the source address for the data frame is the address of the accessory.

8. The method of claim 7 further comprising:
receiving, by the accessory from the destination device, another data frame to be transmitted to the portable media device;
verifying, by the accessory, whether the destination device is authorized to send data to the portable media device; and
transmitting, the other data frame to the portable media device, only if the destination device is authorized to send data to the portable media device.

9. The method of claim 8 wherein the verifying step comprises determining whether the destination address for the destination device is among a list of approved addresses by the portable media device.

10. An accessory communicably coupled to a portable media device, the accessory comprising:
a microcontroller; and
a transceiver coupled to the microcontroller,
wherein the microcontroller in conjunction with the transceiver is configured to:
receive a first command from a portable media device, the first command requesting information about asynchronous data transfer capabilities of the accessory;
send information about the asynchronous data transfer capabilities of the accessory to the portable media device;
receive, by the accessory from the portable media device, a second command, the second command including a data frame and a destination address for a destination device, wherein a source address for the data frame is an address of the portable media device;
receive an instruction, from the portable media device, to transmit the data frame to the destination device;
replace the address of the portable media device for the data frame with an address of the accessory; and
transmit the data frame received from the portable media device to the destination device, wherein the source address for the data frame is the address of the accessory.

* * * * *